US011117609B2

(12) United States Patent
Baña Castro et al.

(10) Patent No.: US 11,117,609 B2
(45) Date of Patent: Sep. 14, 2021

(54) STEERING WHEEL, CONTROL UNIT FOR SUCH A STEERING WHEEL AND STEERING WHEEL ASSEMBLY AND METHOD FOR THE PRODUCTION THEREOF

(71) Applicant: DALPHI METAL ESPANA, S.A., Vigo (ES)

(72) Inventors: Ramon Baña Castro, Vigo (ES); Pedro Pereiro Coto, O Porriño (ES); Miguel Segovia Romero, Salvaterra de Miño (ES); Alberto Santorio Cancelas, Vigo (ES); Rafael Carballido, Vigo Pontevedra (ES); Laurent Bauvineau, Antony (FR); Clément Lemele, Chaville (FR); Nathalie Richeux Guilloux, Igny (FR)

(73) Assignee: DALPHI METAL ESPANA, S.A., Vigo (ES)

( * ) Notice: Subject to any disclaimer, the term of this patent is extended or adjusted under 35 U.S.C. 154(b) by 0 days.

(21) Appl. No.: 16/462,730

(22) PCT Filed: Nov. 30, 2017

(86) PCT No.: PCT/EP2017/080932
§ 371 (c)(1),
(2) Date: May 21, 2019

(87) PCT Pub. No.: WO2018/100039
PCT Pub. Date: Jun. 7, 2018

(65) Prior Publication Data
US 2020/0055535 A1    Feb. 20, 2020

(30) Foreign Application Priority Data
Nov. 30, 2016    (DE) .................... 10 2016 123 134.7

(51) Int. Cl.
B62D 1/04        (2006.01)
B62D 1/08        (2006.01)
B62D 1/10        (2006.01)

(52) U.S. Cl.
CPC ............... B62D 1/046 (2013.01); B62D 1/08 (2013.01); B62D 1/10 (2013.01)

(58) Field of Classification Search
CPC . B62D 1/046; B62D 1/08; B62D 1/10; B62D 1/04; B29C 44/351; B29C 45/14418
See application file for complete search history.

(56) References Cited

U.S. PATENT DOCUMENTS 6,193,267 B1 *   2/2001   Tichvon ................ B60R 21/203
                                                          280/728.2
6,508,485 B2 *   1/2003   Kikuta .................. B60Q 5/003
                                                          200/61.54

(Continued)

FOREIGN PATENT DOCUMENTS

DE            10206487 A1    8/2013
DE        102015006543 A1   12/2015

(Continued)

OTHER PUBLICATIONS

Derwent Abstract of FR 2907721, Suzuki, May 2, 2008 (Year: 2008).*

(Continued)

Primary Examiner — Vinh Luong
(74) Attorney, Agent, or Firm — Tarolli, Sundheim, Covell & Tummino LLP

(57) ABSTRACT

A steering wheel includes a steering wheel axis, a hub for fastening the steering wheel to a steering shaft rotatable about a steering wheel axis, and a steering wheel rim connected to the hub and at least partially surrounding the hub in the circumferential direction. A mounting projection for fastening an operating unit is formed on the steering (Continued)

wheel rim and includes a coupling element for detachably fastening the operating unit as well as a positioning portion for fixing the operating unit in position.

4 Claims, 6 Drawing Sheets

(56) References Cited

U.S. PATENT DOCUMENTS

| | | | | |
|---|---|---|---|---|
| 7,852,225 | B2* | 12/2010 | Lemasson | B62D 1/046 |
| | | | | 340/576 |
| 8,171,820 | B2* | 5/2012 | Song | B62D 1/046 |
| | | | | 74/552 |
| 10,507,860 | B2* | 12/2019 | Adachi | B62D 1/04 |
| 10,814,900 | B2* | 10/2020 | Bana Castro | B29C 44/351 |
| 10,960,915 | B2* | 3/2021 | Bana Castro | B62D 1/04 |
| 2010/0218641 | A1* | 9/2010 | Neumann | B62D 1/046 |
| | | | | 74/552 |
| 2015/0344061 | A1* | 12/2015 | Uematsu | H05B 3/18 |
| | | | | 219/204 |
| 2016/0023667 | A1 | 1/2016 | Sakurai et al. | |
| 2016/0023677 | A1 | 1/2016 | Sakurai et al. | |
| 2018/0257539 | A1* | 9/2018 | Nabe | B60Q 1/0082 |
| 2019/0217800 | A1* | 7/2019 | McMillan | B60Q 5/003 |
| 2019/0367070 | A1* | 12/2019 | Bana Castro | B62D 1/06 |
| 2020/0223471 | A1* | 7/2020 | Bana Castro | B62D 1/04 |

FOREIGN PATENT DOCUMENTS

| | | | | |
|---|---|---|---|---|
| FR | 2907721 | * | 5/2008 | |
| JP | 2000-48926 | * | 2/2000 | |
| WO | WO 2017097926 | * | 6/2017 | B62D 1/06 |

OTHER PUBLICATIONS

Derwent Abstract of JP 2000-48926, Sakata, Feb. 18, 2000 (Year: 2000).*

* cited by examiner

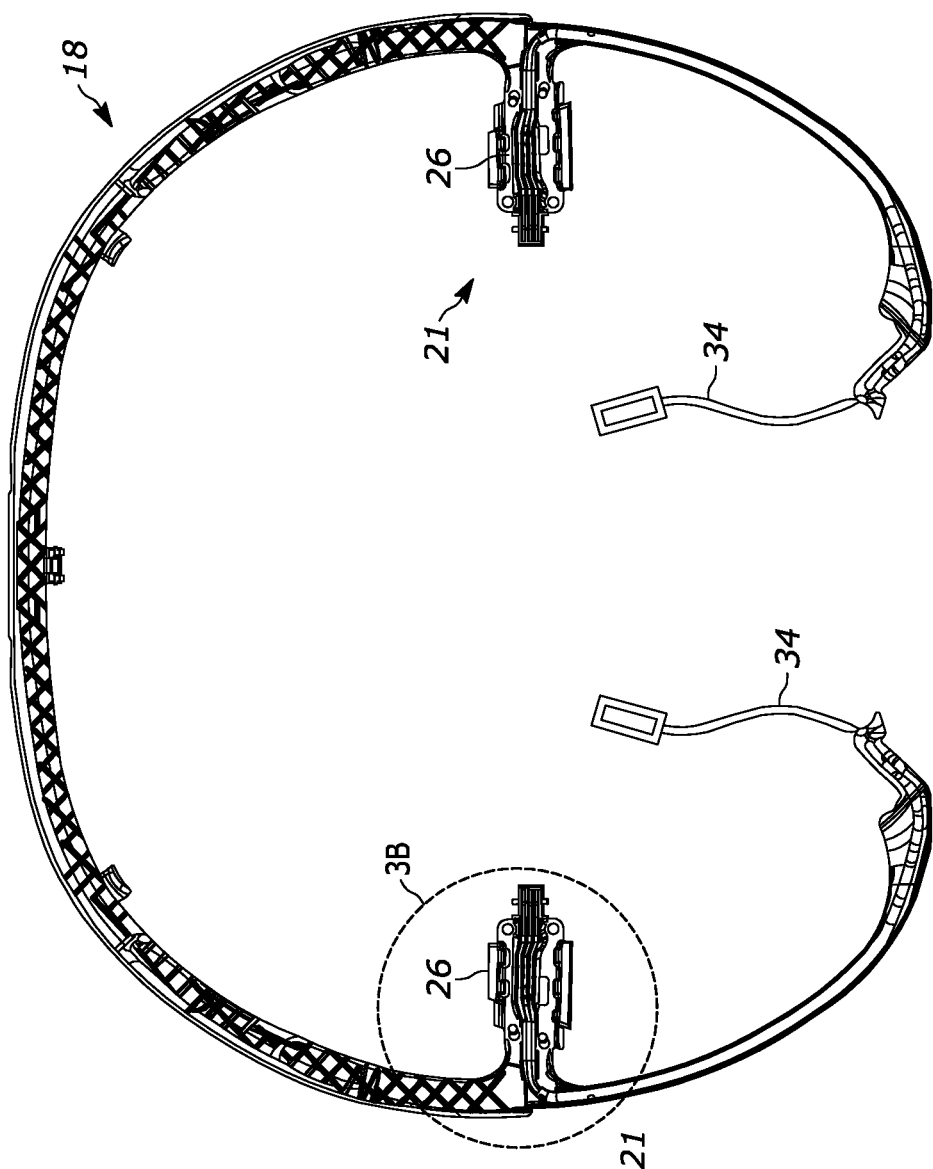
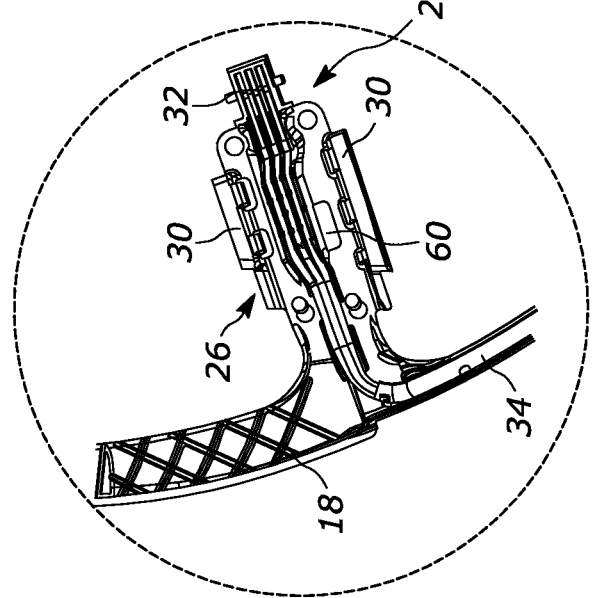
FIG. 3A
FIG. 3B

STEERING WHEEL, CONTROL UNIT FOR SUCH A STEERING WHEEL AND STEERING WHEEL ASSEMBLY AND METHOD FOR THE PRODUCTION THEREOF

CROSS-REFERENCE TO RELATED APPLICATIONS

This application is a national stage of International Application No. PCT/EP2017/080932, filed 30 Nov. 2017, the disclosure of which is incorporated herein by reference in its entirety, and which claimed priority to German Patent Application No. 10 2016 123 134.7, filed 30 Nov. 2016, the disclosure of which is incorporated herein by reference in its entirety.

TECHNICAL FIELD

The present disclosure generally relates to a steering wheel for a vehicle, an operating unit for such steering wheel as well as a steering wheel assembly and a method of manufacture thereof.

BACKGROUND

Vehicle steering wheels at present generally include a hub and a steering wheel rim which is connected to the hub. From prior art numerous steering wheel shapes are known which differ by the number of spokes between the hub and the steering wheel rim, for example.

Steering wheels having a minimum number of spokes offer advantages as regards weight and fabrication. At the same time, efforts are made to optimize the design of the steering wheel. Operating functions of a vehicle are intended to be largely controlled by operating elements provided on the steering wheel.

SUMMARY

It is the object of the invention to provide a steering wheel for a vehicle which with an improved design provides the desired operating functions as well as an operating unit which can be mounted to such steering wheel with minimum effort and can be replaced where needed.

In accordance with the invention, this object is achieved by a steering wheel comprising a steering wheel axis, a hub for fastening the steering wheel to a steering shaft rotatable about the steering wheel axis and a steering wheel rim being connected to the hub and at least partially surrounding the hub in the circumferential direction, wherein a mounting projection for fastening an operating unit is formed on the steering wheel rim and wherein the mounting projection includes a coupling element for detachably fastening the operating unit as well as a positioning portion for fixing the operating unit in position. The coupling element is a screw and/or (preferably) a detent element, for example. Further preferred, the steering wheel rim is connected to the hub merely in an area (lower in the mounting or functional state) (between 4.30 h and 7:30 h). Preferably the steering wheel rim is not connected to the hub, i.e. free from spokes, in an area (lateral and upper in the mounting or functional state) (between 7:30 h and 4:30 h).

In one embodiment of the steering wheel the mounting projection extends, starting from the steering wheel rim, toward a free end. Based on a tangential direction in its starting point at the steering wheel rim, the mounting projection preferably extends at an angle of at least 30° and 90° maximum relative to the tangential direction, especially in the radial direction, i.e. at an angle of 90° with respect to the radial direction. The mounting projection may extend inwardly or outwardly, viz. in the direction of the hub away from the hub.

Preferably, the steering wheel rim spans a plane with the mounting projection extending in said plane or in parallel to said plane. Alternatively, it is also imaginable, however, that the mounting projection extends out of said plane, especially perpendicularly out of said plane.

According to another embodiment of the steering wheel, the coupling element is a detent element for locking the operating unit on the steering wheel rim, especially a rigid locking projection. The positioning portion may be a guiding portion which forms a mounting guide for the operating unit along with a guiding portion of the operating unit.

The steering wheel rim preferably includes a steering wheel armature comprising an integrally formed armature projection which at least partially forms the mounting projection, wherein the coupling element and/or the positioning portion is/are formed on the armature projection. The steering wheel armature preferably is a metal part, for example a die cast component made from a magnesium alloy or aluminum alloy. In this way, the steering wheel armature is especially suited for absorbing forces acting on the operating unit via the coupling element. For configuring the positioning portion such as a mounting guide the demands to dimensional accuracy of the steering wheel armature are higher.

For the rest, the steering wheel rim preferably includes, apart from the steering wheel armature, an armature cover including an integrally formed cover projection which at least partially constitutes the mounting projection, wherein the coupling element and/or the positioning portion is/are formed on the cover projection. The armature cover preferably is a plastic component which can be manufactured with high dimensional accuracy at minimum cost and moreover has a certain flexibility depending on the material and the material thickness. Thus, the armature cover is especially suited to provide a mounting guide for the operating unit by means of the positioning portion, for example. For forming the coupling element in order to produce a robust connection the armature cover must exhibit the required stability. Therefore, especially preferred the coupling element is configured, especially integrally formed, on the steering wheel armature and the positioning portion is configured, especially integrally formed, on the armature cover.

According to another embodiment of the steering wheel, the steering wheel rim includes a steering wheel armature, an armature cover as well as a line for data transmission and/or power supply of the operating unit, with the steering wheel armature and the armature cover forming a line channel in which the line extends.

The armature cover may have an integrally formed cover projection which at least partially forms the mounting projection, wherein at a free end of the cover projection a plug connector is formed in which a line for data transmission and power supply of the operating unit ends. Said plug connector is preferably formed to be complementary to a plug connector of the operating unit.

Finally, a steering wheel armature of the steering wheel as well as, where necessary, an optionally provided armature cover may be surrounded at least partially by a flexible material, especially foam coating.

The object is also achieved, for the rest, by an operating unit, especially a (multi-function) switch assembly for such steering wheel which includes a coupling element and a positioning portion and is adapted to be attached to the mounting projection of the steering wheel and to be positively coupled to the mounting projection. Preferably, the operating unit can be attached from a free end of the mounting projection in the direction of the steering wheel rim.

Preferably the coupling element of the operating unit is a detent element, especially an elastic detent spring. Furthermore, the positioning portion of the operating unit may comprise two parallel guide rails, with the coupling element being preferably sandwiched between the two guide rails.

According to one embodiment, in the operating unit a blind-hole type recess for receiving the mounting projection is provided which extends from an opening on the surface of the operating unit to a closed end, wherein at the closed end of the recess an electric plug connector for connecting the operating unit to the steering wheel is formed.

For the rest, the invention relates to a steering wheel assembly comprising an afore-described steering wheel and an afore-described separate operating unit, the operating unit being attached to the mounting projection and being fastened to the mounting projection by form closure.

According to one embodiment of the steering wheel assembly it is preferred that the operating unit and/or the mounting projection include(s) a recess for a tool to release the positive connection between the operating unit and the steering wheel. The recess may concretely be in the form of a notch, through hole, slit or the like.

Finally, the invention relates to a method of manufacturing a steering wheel assembly comprising the following steps of: (a) providing an afore-described operating unit comprising an electrical connection for signal transmission and/or power supply of electrical components of the operating unit; (b) providing a steering wheel, especially an afore-described steering wheel, wherein on a steering wheel rim a mounting projection is provided and in the steering wheel rim an electric line for electrically connecting the operating unit is provided; (c) attaching the operating unit to the mounting projection of the steering wheel rim in a mounting direction until a final mounting position is reached in which a positive connection exists between the operating unit and the steering wheel rim, wherein, upon attachment to the mounting projection, the operating unit is electrically connected to the electric line in the steering wheel rim before the final mounting position is reached.

In accordance with a method variant, in the steering wheel assembly an identifying unit for displaying a correct electrical connection is provided, wherein electric current is supplied to the electric line after attachment of the operating unit and the identifying unit then, in the case of a correct electrical connection of the operating unit, outputs a signal, especially an optical signal. The identifying unit is mounted, for instance, in the operating unit or in the steering wheel.

BRIEF DESCRIPTION OF THE DRAWINGS

Further features and advantages of the invention will be evident from the following description of a preferred embodiment with reference to the drawings, wherein:

FIGS. 3A-3B show a separate view of an armature cover of the steering wheel;

Like reference numerals refer to like parts throughout the description of several views of the drawings.

DETAILED DESCRIPTION

Figure 1A:
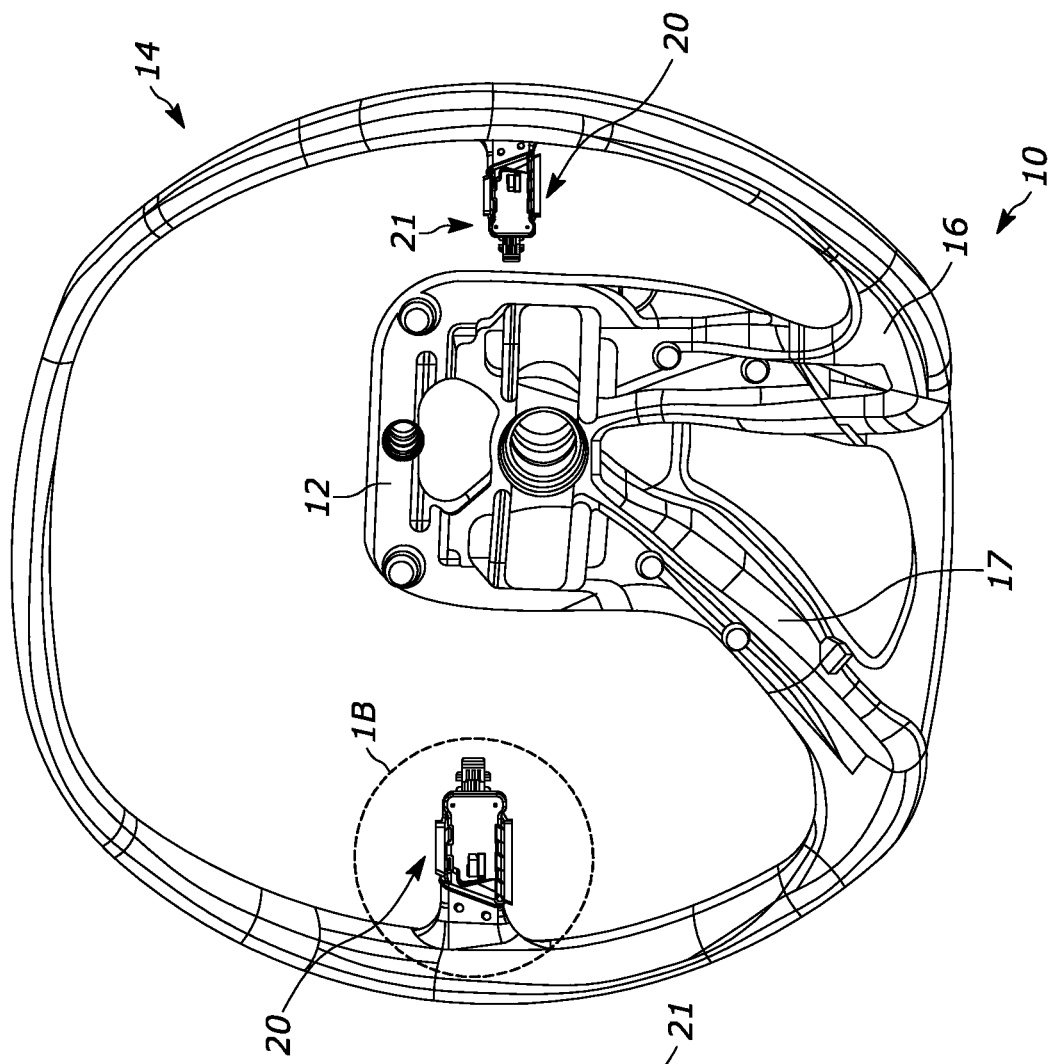
FIGS. 1A-1B show a top view of a steering wheel according to the invention.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 1B:
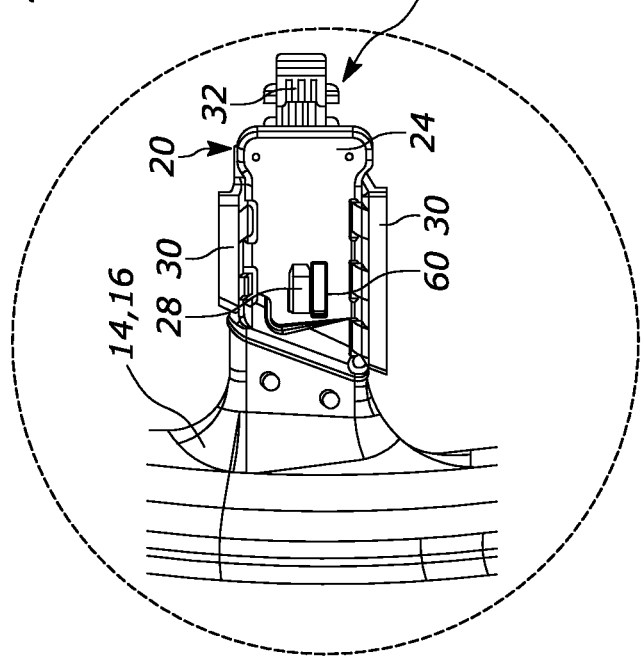
Figure 2:
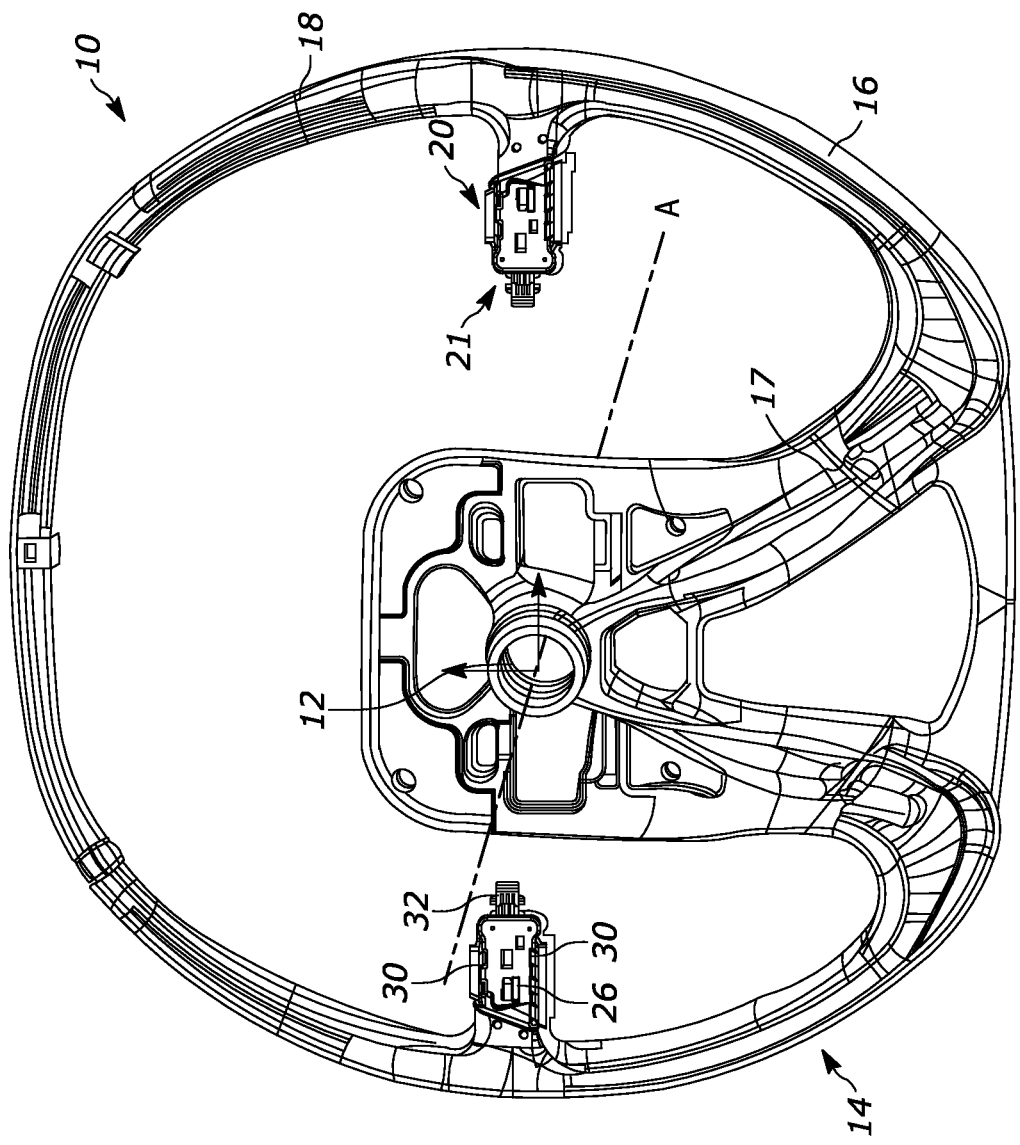
FIG. 2 shows a rear view of the steering wheel of FIG. 1A.

FIGS. 1A-2 illustrate views of a steering wheel 10 for an automotive vehicle comprising a steering wheel axis A, a hub 12 for fastening the steering wheel 10 to a steering shaft rotatable about the steering wheel axis A as well as a steering wheel rim 14 which is connected to the hub 12 and at least partially surrounds the hub 12 in the circumferential direction.

Furthermore, a steering wheel armature 16 is provided as self-supporting component of the steering wheel 10, wherein the hub 12, the steering wheel rim 14 as well as one or more spokes 17 of the steering wheel 10 comprise sections of the steering wheel armature 16. According to FIGS. 1A-1B, the steering wheel armature 16 is a one-piece metal component, for example a die cast component made from a magnesium alloy or an aluminum alloy, but it may alternatively be composed of plural armature components.

It is evident from FIG. 2 that the steering wheel 10, especially the steering wheel rim 14, on a rear side of the steering wheel armature 16 includes an armature cover 18 which is fastened to the steering wheel armature 16. The rear side in this context is the side which in the mounted state of the steering wheel 10 is facing an instrument panel of the vehicle. The armature cover 18 especially is a plastic component which forms a channel for guiding electric lines, for example, together with the steering wheel armature 16.

On the steering wheel rim 14 mounting projections 20 for fastening an operating unit 22 (cf. FIGS. 8 and 9, for example) are formed, with each of the mounting projections 16 extending toward a free end 21 starting from the steering wheel rim 14. In particular, the mounting projections 16 extend in a plane or in parallel to a plane which is spanned by the steering wheel rim 14 and extends substantially normal to the steering wheel axis A.

In the present embodiment, starting from the steering wheel rim 14 the mounting projections 16 project inwardly, i.e. in the direction of the hub 12, especially substantially radially inwardly. As a matter of course, also configuration variants are imaginable in which the mounting projections 16 project outwardly, i.e. away from the hub 12, or extend inclined relative to the plane being spanned by the steering wheel rim.

According to FIGS. 1A-2, the mounting projection 20 is formed by an armature projection 24 integrally formed on the steering wheel armature 16 as well as a cover projection 26 integrally formed on the armature cover 18. It is evident especially by way of the detailed cutout from FIG. 1B that the mounting projection 20 includes a coupling element 28 for detachably fastening the operating unit 22 as well as a positioning portion 30 for fixing the operating unit 22 in position. The coupling element 28 in the present case is a detent element for locking the operating unit 22 at the steering wheel rim 14, wherein it is imaginable as an alternative that the coupling element 28 is a screw thread or a screw for fastening the operating unit 22 to the steering wheel rim 14. In any case, the coupling element 28 ensures safe and robust connection and prevents the operating unit 22 from inadvertently detaching from the steering wheel rim 14. The positioning portion 30, on the other hand, serves for exact alignment of the operating unit 22 and mainly contributes, transversely to a mounting or dismounting direction, to a support of the operating unit 22 which is largely free from play. Accordingly, the positioning portion 30 especially is a guiding portion which, together with a guiding portion of the operating unit 22, forms a mounting guide.

In the shown embodiment, the coupling element 28 is formed integrally with the armature projection 24 of the steering wheel armature 16 as a rigid catch, whereas the positioning portion 30 is integrally formed with the cover projection 26 of the armature cover 18 in the form of two parallel guide rails.

Apart from the coupling element 28 and the positioning portion 30, at its free end 21 the mounting projection 20 includes a plug connector 32 in which an electric line 34 for data transmission and/or power supply of the operating unit 22 ends. Said plug connector 32 is appropriately configured to be complementary to a plug connector 36 of the operating unit 22.

FIG. 3A illustrates a top view of a side of the armature cover 18 facing the steering wheel armature 16. It is evident that the steering wheel 10 includes the electric line 34 for data transmission and/or power supply of the operating unit 22, wherein the armature cover 18 in its condition mounted on the steering wheel armature 16 together with the steering wheel armature 16 forms a protected line channel in which the line 34 extends. The plug connector 32 in this case is concretely formed integrally with a free end of the cover projection 26 in which the electric line 34 for data transmission and/or power supply of the operating unit 22 ends.

Figure 4:
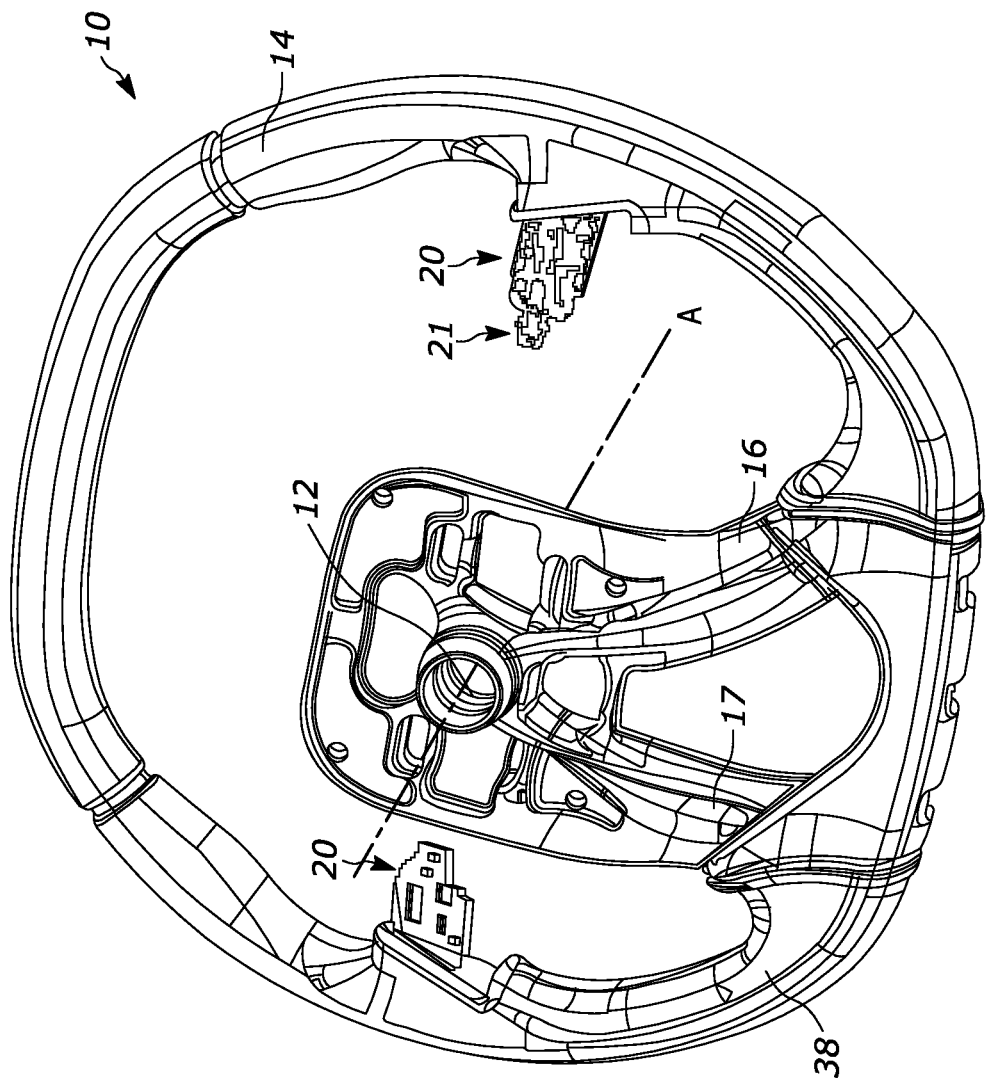
FIG. 4 shows the rear view of the steering wheel according to FIG. 2 including an applied foam coating.

Analogously to FIG. 2, FIG. 4 shows a rear view of the steering wheel 10, wherein the steering wheel armature 16 and the armature cover 18 are partially surrounded by flexible material, preferably are foam-coated. The steering wheel rim 14 consequently includes a foam coating 38. Further, the steering wheel rim 14 may optionally include an integrated steering wheel heating as well as a wood or leather wrapping.

Figure 5:
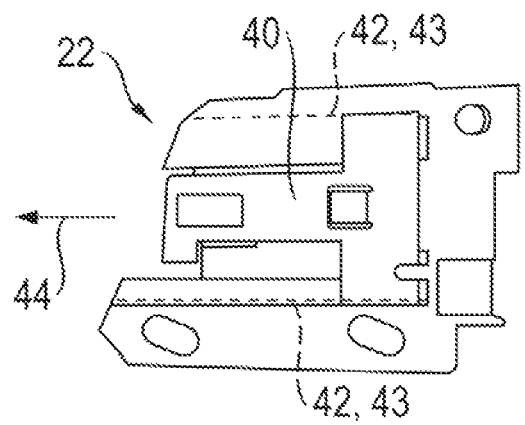
FIG. 5 shows a view of part of an operating unit according to the invention for a steering wheel according to the invention.
Figure 6:
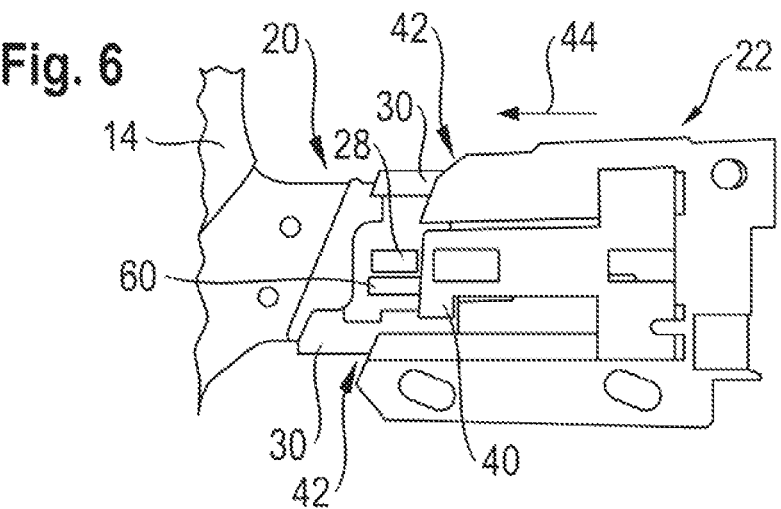
FIG. 6 shows a partial view of a steering wheel assembly according to the invention in the area of an operating unit prior to fastening thereof to the steering wheel.
Figure 7:
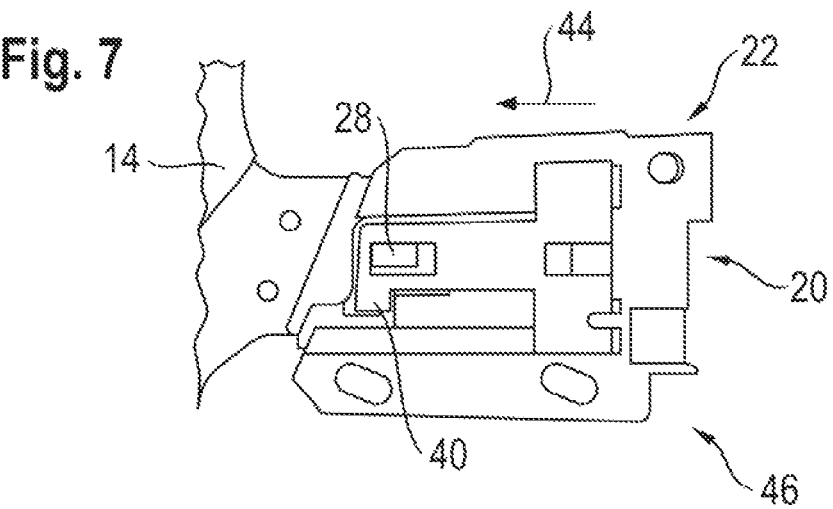
FIG. 7 shows the partial view of the steering wheel assembly according to FIG. 6 after fastening of the operating unit to the steering wheel.

FIGS. 5 to 7 show, for illustration of the assembly on the steering wheel rim 14, a cut or dismounted operating unit 22 which comprises a coupling element 40 as well as a positioning portion 42 and is adapted to be attached to the mounting projection 20 of the steering wheel 10 and to be positively coupled to the mounting projection 20.

Figure 9:
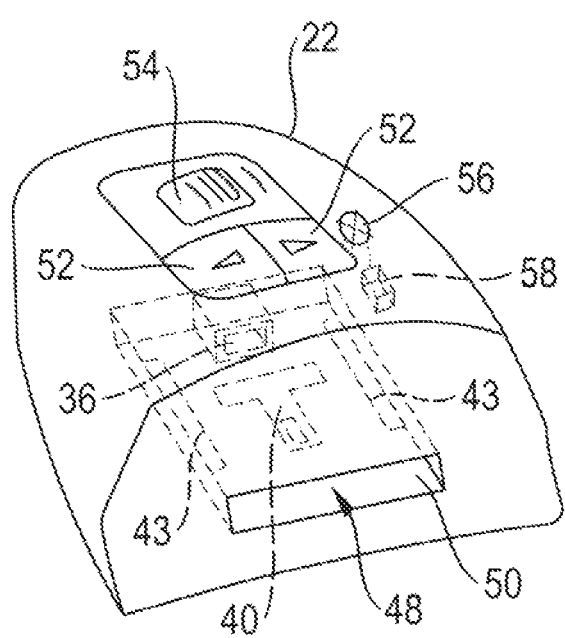
FIG. 9 shows a schematic perspective view of an operating unit according to the invention.

According to FIG. 5, the coupling element 40 is an elastic detent spring, concretely a leaf spring made from spring steel. The positioning portion 42 comprises two parallel guide rails 43 (in FIG. 5 emphasized in bold broken lines)

with the coupling element 40 being sandwiched between the guide rails 43 (cf. also FIG. 9).

FIG. 6 illustrates pushing the operating unit 22 in a mounting direction 44 from the free end 21 of the mounting projection 20 toward the steering wheel rim 14, wherein the guide rails 43 of the operating unit 22 slide at the positioning portion 30 of the mounting projection 20 configured as guiding portion and ensure exact alignment of the operating unit 22 relative to the steering wheel rim 14.

The detent spring according to FIG. 6 is located, viewed in the mounting direction 44, directly ahead of the coupling element 28 of the mounting projection 20 configured as rigid catch so that the operating unit 22 is not yet fixed to the steering wheel rim 14 in the mounting direction 44 as well as in an opposite dismounting direction.

FIG. 7 illustrates the operating unit 22 in its final mounting position in which the interacting coupling elements 28, 40 bring about a click connection between the operating unit 22 and the steering wheel rim 14. Concretely speaking, the detent spring is elastically deformed by the inclined back of the rigid catch, when pushing on the operating unit 22, and then snaps back behind the catch so that the operating unit 22 is tightly connected to the steering wheel rim 14.

The final mounting position of the operating unit 22 can be defined especially by a stop at the armature projection 24, at the cover projection 26 or at the foam coating 38. After the afore-described mounting of the operating unit 22 a steering wheel assembly 46 including the steering wheel 10 and the operating unit 22 is resulting, wherein the operating unit 22 is attached to the mounting projection 20 of the steering wheel 10 and is fastened to the mounting projection 20 by form closure.

Figure 8:
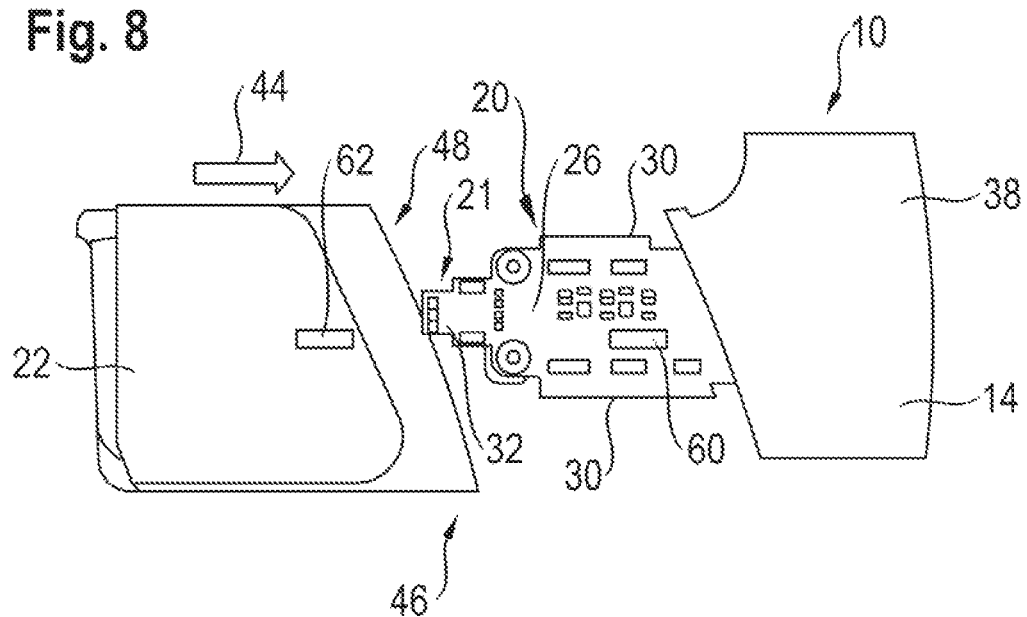
FIG. 8 shows a mounting operation of a pre-fabricated operating unit according to the invention on a steering wheel according to the invention.

The method of manufacturing said steering wheel assembly 46 excels especially by the fact that the operating unit 22 is electrically connected to the electric line 34 in the steering wheel rim 14 automatically by the plug connectors 32, 36, when the operating unit is attached to the mounting projection 20 before the final mounting position is reached (cf. FIG. 8).

According to FIG. 9, the operating unit 22 includes a blind-hole type recess 48 for receiving the mounting projection 20 which extends from an opening 50 on the surface of the operating unit 22 to a closed end, wherein at said closed end of the operating unit 22 the electric plug connector 36 configured to be complementary to the plug connector 32 of the mounting projection 20 is provided for connecting the operating unit 22 to the steering wheel 10. In accordance with FIG. 9, the operating unit 22 is a multi-function switch assembly which, by way of example, includes two press switches 52 and a knurled wheel 54, wherein also other switching elements such as rotary switches, touchpads or touchscreens may be provided, of course. In addition, the operating unit 22 in the present case also comprises a display element 56, especially an illuminant.

The method of manufacturing the steering wheel assembly 46 optionally includes a step for checking the connection of the operating unit 22. For this purpose, in the steering wheel assembly 46 for example an identifying unit 58 for displaying a correct electrical connection of the operating unit 22 is provided, wherein electric current is supplied to the electric line 34 after attachment of the operating unit 22 and the identifying unit 58 outputs a predetermined signal in the case of a correct electrical connection of the operating unit 22.

According to FIG. 9, the identifying unit 58 is integrated in the operating unit 22 and comprises the display element 56. Alternatively, the identifying unit 58 may also be arranged at or in the steering wheel 10, however. As soon as the identifying unit 58 determines, after the electric line 34 has been supplied with current, a correct electrical connection of the operating unit 22 (for example via resistance measurement), the predetermined signal is triggered at the display element 56. In this way, after mounting the operating unit 22 on the steering wheel 10, the electrical connection can be checked in a quick and easy manner. For dismounting the operating unit 22 the operating unit 22 and/or the mounting projection 20 include(s) a recess for a tool for releasing the positive connection between the operating unit 22 and the steering wheel 10.

According to the detailed cutout of FIG. 1B, the recess especially is a through opening 60 in the mounting projection 20 as well as, according to FIG. 8, a through opening 62 in the operating unit 62, especially in a housing of the operating unit 22. It is evident from FIGS. 6 and 7 that a portion of the coupling element 40 in the form of a detent spring abuts on the through opening 60 in the final mounting position of the operating unit 22. As a consequence, the click connection between the coupling elements 28, 40 can be released by deforming the detent spring by an appropriate tool and thus the operating unit 22 can be removed from the mounting projection 20.

The invention claimed is:

1. A steering assembly comprising:
a steering wheel further including:
a steering wheel axis,
a hub for fastening the steering wheel to a steering shaft being rotatable about the steering wheel axis, and
steering wheel rim being connected to the hub and at least partially surrounding the hub in the circumferential direction,
wherein a mounting projection for fastening an operating unit is configured on the steering wheel rim,
wherein the mounting projection includes a first coupling element for detachably fastening the operating unit as well as a first positioning portion for fixing the operating unit in position; and
an operating unit having a second coupling element as well as a second positioning portion and is adapted to be attached to the mounting projection of the steering wheel and to be positively coupled to the mounting projection;
wherein the first positioning portion comprises two parallel guide rails with the first coupling element being sandwiched between the guide rails.

2. A steering assembly comprising:
a steering wheel further including:
a steering wheel axis,
a hub for fastening the steering wheel to a steering shaft being rotatable about the steering wheel axis, and
steering wheel rim being connected to the hub and at least partially surrounding the hub in the circumferential direction,
wherein a mounting projection for fastening an operating unit is configured on the steering wheel rim,
wherein the mounting projection includes a first coupling element for detachably fastening the operating unit as well as a first positioning portion for fixing the operating unit in position; and
an operating unit having a second coupling element as well as a second positioning portion and is adapted to be attached to the mounting projection of the steering wheel and to be positively coupled to the mounting projection;

wherein a blind-hole recess for receiving the mounting projection is provided which extends from an opening on the surface of the operating unit to a closed end, with an electric plug connector being formed at the closed end of the blind-hole recess.

3. A steering assembly comprising:
a steering wheel further including:
a steering wheel axis,
a hub for fastening the steering wheel to a steering shaft being rotatable about the steering wheel axis, and
steering wheel rim being connected to the hub and at least partially surrounding the hub in the circumferential direction,
wherein a mounting projection for fastening an operating unit is configured on the steering wheel rim,
wherein the mounting projection includes a first coupling element for detachably fastening the operating unit as well as a first positioning portion for fixing the operating unit in position; and
an operating unit having a second coupling element as well as a second positioning portion and is adapted to be attached to the mounting projection of the steering wheel and to be positively coupled to the mounting projection;
wherein the operating unit is attached to the mounting projection and is positively fastened to the mounting projection and
wherein the operating unit and the mounting projection include a recess for a tool for releasing the positive connection between the operating unit and the steering wheel.

4. A method of manufacturing a steering assembly comprising the following steps of:
a) providing the steering assembly according to claim 1, wherein the operating unit further comprising an electrical connection for signal transmission and/or power supply of electric components of the operating unit;
b) providing an electric line within the steering wheel rim for electrically connecting the operating unit; and
c) attaching the operating unit to the mounting projection of the steering wheel rim in a mounting direction up to reaching a final mounting position in which a positive connection exists between the operating unit and the steering wheel rim, wherein, when the operating unit is attached to the mounting projection, it is electrically connected to the electric line within the steering wheel rim before the final mounting position is reached;
wherein an identifying unit for displaying a correct electrical connection of the operating unit is provided, and wherein electric current is supplied to the electric line after attaching the operating unit and, in the case of correct electrical connection of the operating unit, the identifying unit outputs a signal.

* * * * *